(12) United States Patent
Ito et al.

(10) Patent No.: US 12,099,312 B2
(45) Date of Patent: Sep. 24, 2024

(54) IMAGE FORMING APPARATUS (71) Applicant: CANON KABUSHIKI KAISHA, Tokyo (JP)

(72) Inventors: Shingo Ito, Tokyo (JP); Masashi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 17/848,335

(22) Filed: Jun. 23, 2022

(65) Prior Publication Data
US 2023/0015377 A1 Jan. 19, 2023

(30) Foreign Application Priority Data

Jul. 1, 2021 (JP) ................. 2021-110327

(51) Int. Cl.
G03G 15/00 (2006.01)
G02B 26/12 (2006.01)
G03G 15/04 (2006.01)
G03G 15/043 (2006.01)

(52) U.S. Cl.
CPC ......... *G03G 15/043* (2013.01); *G02B 26/125* (2013.01); *G03G 15/04072* (2013.01)

(58) Field of Classification Search
CPC ......... G03G 15/04072; G03G 15/0409; G03G 15/043; G02B 26/124; G02B 26/125
See application file for complete search history.

(56) References Cited

U.S. PATENT DOCUMENTS

| 6,188,419 | B1 | 2/2001 | Katamoto et al. ............ 347/129 |
| 8,384,752 | B2 | 2/2013 | Tomita .......................... 347/224 |
| 2015/0061217 | A1* | 3/2015 | Minakuchi ......... G03G 15/6502 |
| | | | 271/258.01 |

FOREIGN PATENT DOCUMENTS

| JP | H11-65212 | 3/1999 |
| JP | 2003-136777 | 5/2003 |
| JP | 2007-298793 | 11/2007 |
| JP | 2008-233151 | 10/2008 |
| JP | 5896620 B2 | 3/2016 |

* cited by examiner

Primary Examiner — Hoang X Ngo
(74) Attorney, Agent, or Firm — Venable LLP (57) ABSTRACT An image forming apparatus includes an exposure unit that reflects a laser beam emitted from a light source by a polygon mirror having a plurality of reflection surfaces to form a latent image on a photosensitive member, and a control unit that controls the image forming apparatus in a plurality of operation modes including a normal mode and a low speed mode having a slower process speed than the normal mode. The control unit controls the polygon mirror to use all of the plurality of reflection surfaces to reflect the laser beam when in the normal mode. When in the low speed mode, the control unit makes the process speed faster than 0.5 times that of the normal mode, rotates the polygon mirror faster than in the normal mode, and controls the polygon mirror to use only some of the plurality of reflection surfaces to reflect the laser beam.

10 Claims, 6 Drawing Sheets

IMAGE FORMING APPARATUS

BACKGROUND OF THE INVENTION

Field of the Invention

The present invention relates to an image forming apparatus.

Description of the Related Art

When forming images on rough or heavy paper to which toner is less fixable than to ordinary paper, one technique for laser beam printers uses a low speed mode in which images are formed at a slower process speed than in a normal mode to ensure fixability. According to this technique, the fixability is improved because slowing down the process speed prolongs the time for a recording material to pass through the fixing unit and enables sufficient heat for toner image fixation to be conducted to the toner and recording material.

One method of realizing a low speed mode is to slow down the rotation speed of a photosensitive member, while keeping the same rotation speed of a polygon mirror in an exposure apparatus that exposes the photosensitive member as that of the normal mode. In this method, the resolution in a sub scanning direction is changed by image processing so that there is no difference in resolution in the sub scanning direction between the normal mode and the low speed mode. Using each alternate reflection surface of a polygon mirror is another method of realizing a low speed mode (see Japanese Patent No. 5896620, Japanese Patent Application Publication No. 2007-298793). The resolution of a latent image in the sub scanning direction can be made the same in both the normal mode and the low speed mode by making the rotation speed of the photosensitive member 0.5 times that of the normal mode, for example, while using each alternate reflection surface of the polygon mirror.

SUMMARY OF THE INVENTION

A large change in process speed between a low speed mode and a normal mode causes changes in image qualities such as halftone density, appearance of outline characters, small dot size, and so on. In particular, in an image forming apparatus that develops toner images by a jumping development method, a change in process speed changes the number of back and forth movements of toner in a development nip. This causes large changes in image qualities between the low speed mode and the normal mode. The image processing such as tone curve correction can only reduce such changes in image qualities to a limited extent. An object of the present invention is to minimize changes in image qualities between operation modes in an image forming apparatus that operates in a plurality of operation modes with different process speeds.

An image forming apparatus according to the present invention comprising:
- a photosensitive member;
- a polygon mirror rotated by a drive unit and having a plurality of reflection surfaces;
- an exposure unit configured to form a latent image on the photosensitive member by reflecting a laser beam emitted from a light source with the polygon mirror and by scanning the photosensitive member;
- a developing unit configured to form a toner image on the photosensitive member by causing toner to adhere to the latent image formed on the photosensitive member;
- a transfer unit configured to transfer the toner image formed on the photosensitive member onto a recording material directly or via an intermediate transfer member;
- a fixing unit configured to fix the toner image by heating the recording material onto which the toner image has been transferred; and
- a control unit configured to control operation of the image forming apparatus in a plurality of operation modes including a normal mode and a low speed mode having a slower process speed than the normal mode in accordance with an input instruction, the process speed defining a speed of the recording material passing through the fixing unit, wherein the control unit controls the polygon mirror of the exposure unit to use all of the plurality of reflection surfaces to reflect the laser beam when an instruction designating the normal mode as the operation mode is input, or when no instruction designating a specific operation mode is input, and the control unit controls making the process speed of the low speed mode faster than 0.5 times the process speed of the normal mode, rotating the polygon mirror faster than in the normal mode, and controlling the polygon mirror of the exposure unit to use only some of the plurality of reflection surfaces to reflect the laser beam, when an instruction designating the low speed mode as the operation mode is input.

According to the present invention, changes in image qualities between operation modes can be minimized in an image forming apparatus that operates in a plurality of operation modes with different process speeds.

Further features of the present invention will become apparent from the following description of exemplary embodiments with reference to the attached drawings.

DESCRIPTION OF THE EMBODIMENTS

Preferred embodiments of the present invention will be hereinafter described in detail with reference to the drawings. The following embodiments are described for illustrative purposes only, and should not be construed as limiting the present invention to the contents of the embodiments. In the drawings referred to below, some of the constituent elements that are not essential for the description of embodiments are omitted.

Figure 1:
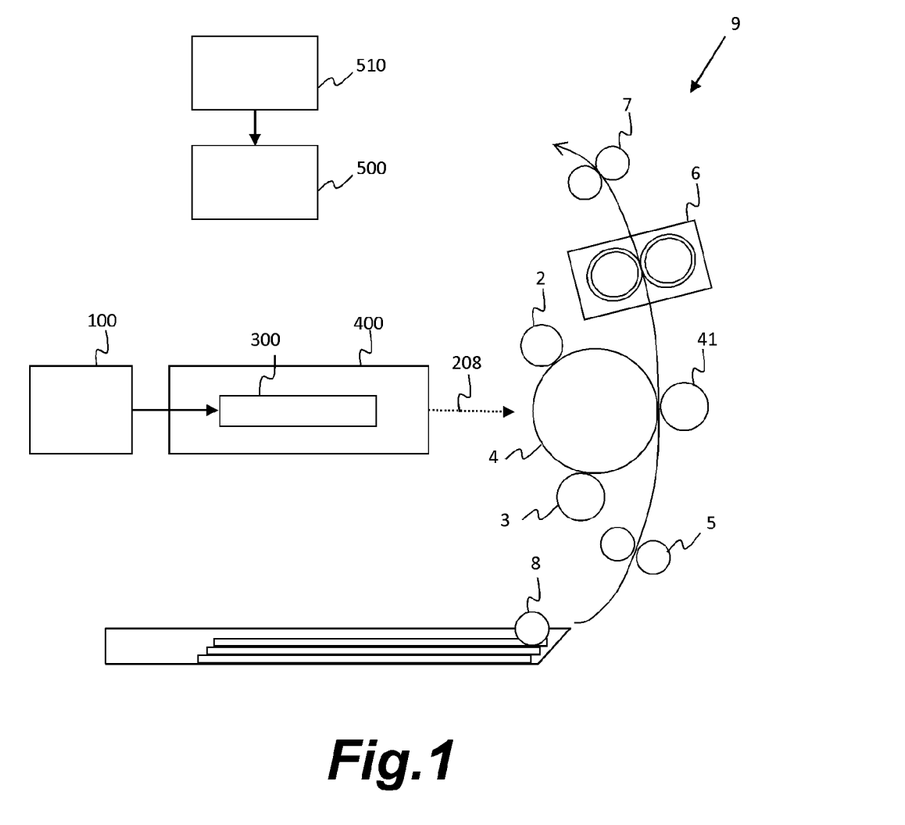
FIG. 1 is a cross-sectional view illustrating a schematic configuration of an image forming apparatus according to one embodiment.

FIG. 1 is a schematic configuration diagram of an image forming apparatus 9 according to this embodiment. The image forming apparatus 9 is an A4 monochrome laser printer. A laser driver 300 of an exposure apparatus 400 emits a laser beam 208 based on image data output from an image signal generating unit 100. This laser beam 208 scans and exposes a photosensitive member 4 charged by a charging unit 2 made up of a conductive rubber roller or the like to form a latent image on a surface of the photosensitive member 4. A developing unit 3 develops the latent image on the surface of the photosensitive member 4 with toner to form a toner image. Recording materials supplied from a paper feeding unit 8 are transported by rollers 5 to a nip area between the photosensitive member 4 and a transfer roller 41. The transfer roller 41 is a transfer unit that transfers the toner image formed on the photosensitive member 4 onto a recording material transported from the rollers 5. While this embodiment shows a configuration in which a toner image is directly transferred from the photosensitive member 4 to a recording material, the image forming apparatus may be configured such that the toner image is transferred indirectly to a recording material via an intermediate transfer member. Untransferred toner that failed to be transferred onto the recording material and remained on the surface of the photosensitive member 4 is cleaned by a cleaning unit (not shown) so that the surface of the photosensitive member 4 is ready for the next image formation. The recording material carrying the transferred toner image is transported to a fixing unit 6. The fixing unit 6 is a fixing unit that fixes the toner image on the recording material by applying heat and pressure to the recording material. The recording material on which the toner image has been fixed is discharged to the outside of the image forming apparatus 9 by discharge rollers 7. The image forming apparatus 9 includes a controller 500 that controls operation of the image forming apparatus 9, and an input device 510 for allowing a user to input instructions to the controller 500. The input device 510 is an input unit such as, for example, buttons provided to a main body of the image forming apparatus 9, a touchscreen display, a keyboard, or a computer connected to the image forming apparatus 9 directly or indirectly via a network or the like. The controller 500 is a control unit that controls the operation of the image forming apparatus 9 in a plurality of operation modes including a normal mode and a low speed mode to be described later based on an instruction input from the input device 510. The controller 500 also controls operation of the exposure apparatus 400, photosensitive member 4, rollers 5, fixing unit 6, and so on in accordance with the operation mode designated in an instruction input from the input device 510, to control the process speed of the image forming apparatus 9. The process speed defines the speed of a recording material passing through the fixing unit 6. When no instruction designating a specific operation mode is input from the input device 510, the controller 500 controls the operation of the image forming apparatus 9 in the normal mode as a default operation mode.

Exposure Apparatus

Figure 2:
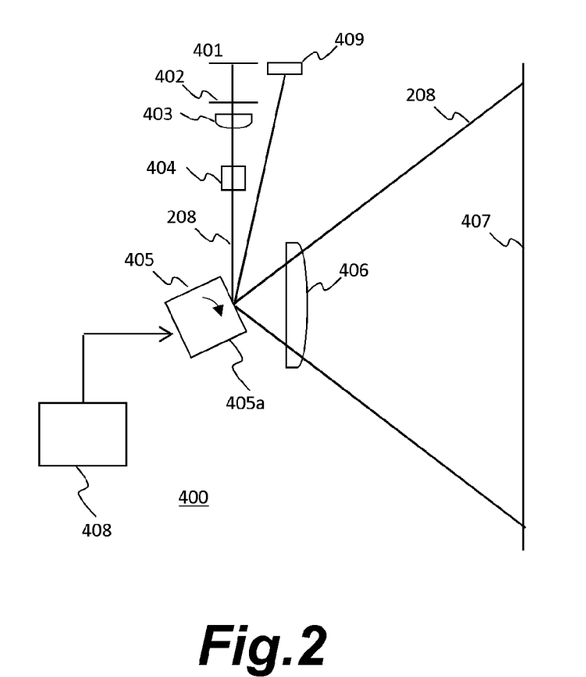
FIG. 2 is a top plan view illustrating a schematic configuration of an exposure apparatus according to the embodiment.

FIG. 2 illustrates a cross section of the exposure apparatus 400 that is an exposure unit according to the embodiment viewed from a main scanning direction. The laser beam 208 emitted from a light source 401 is adjusted into an oblong shape by an aperture stop 402, and enters a coupling lens 403. After passing through the coupling lens 403, the laser beam 208 is converted into substantially parallel light, and enters an anamorphic lens 404. Substantially parallel light includes weak convergent rays and weak divergent rays. The anamorphic lens 404 shows positive refraction within a cross section along the main scan beam, and converts incident light rays into convergent light within the cross section along the main scan beam. The anamorphic lens 404 focuses the light rays near reflection surfaces 405a of a polygon mirror 405 within a cross section along a sub scan beam to form a line image elongated along the main scanning direction.

The light rays that passed through the anamorphic lens 404 are reflected by a reflection surface 405a of the polygon mirror 405. The polygon mirror 405 includes a plurality of reflection surfaces 405a. In this embodiment, the polygon mirror 405 has four reflection surfaces 405a. The laser beam 208 reflected by a reflection surface 405a transmits through an image forming lens 406, meets a surface of the photosensitive member 4, and forms a predetermined spot-like image (hereinafter, "spot") there. The polygon mirror 405 is rotated at a constant angular speed by a drive motor 408 that is a drive unit. Therefore, the spot moves along the main scanning direction on the scanned surface 407 of the photosensitive member 4 so that an electrostatic latent image is formed on the scanned surface 407. The main scanning direction herein refers to a direction parallel to the surface of the photosensitive member 4 and perpendicular to a moving direction of the surface of the photosensitive member 4.

A beam detect (hereinafter, "BD") sensor 409 is an optical system for synchronization, for determining the timing at which an electrostatic latent image is written on the scanned surface 407. A photodiode of the BD sensor 409 detects an incident laser beam 208. The timing of the writing is controlled based on the timing at which the BD sensor 409 detected the laser beam 208. The BD sensor 409 can detect the timing accurately when the laser power is in a certain range. Detection accuracy lowers when the laser power falls below this range, in which case the timing of writing the electrostatic latent image may become out of sync. An additional focusing lens could be provided in front of the BD sensor 409 to enhance the detection accuracy when the laser power is low, although this would require increased installation space and cost. The light source 401 may be configured with a single light-emitting unit, or made up of a plurality of light-emitting units that allow individual light emission control.

Normal Mode and Low Speed Mode

The image forming apparatus 9 is controlled by the controller 500 to operate in a plurality of operation modes including those with differing process speeds that define the speed of a recording material passing through the fixing unit 6. In this embodiment, the process speed is also the rotation speed of the photosensitive member 4. Specifically, the controller 500 controls the operation of the image forming apparatus 9 in a plurality of operation modes including a normal mode that is a default operation mode used in standard image formation, and a low speed mode with a slower process speed than the normal mode. When printing in the normal mode of the image forming apparatus 9, the photosensitive member 4 is rotated and the recording material is transported at 200 mm/sec. The normal mode is most often used in A4 monochrome laser printers and is the default mode when leaving the factory. Namely, the normal mode covers the widest range of recording materials. A4 or letter size ordinary paper are printed with a resolution at 600 dpi in the normal ode. The low speed mode is an operation mode suitable for image formation on a recording material with poor toner fixability, such as heavy paper, rough paper and the like. The user can input an instruction designating a desired operation mode via the input device 510. The controller 500 controls the operation of the image forming apparatus 9 in accordance with an operation mode designated in an instruction input from the input device 510. The input device 510 may be configured to allow the user to directly designate either the normal mode or the low speed mode, or, may be configured to allow the user to designate a type of recording material, the controller 500 then setting an optimal operation mode in accordance with the designated type of recording material. For example, when the user designates ordinary paper as the recording material, the controller 500 may set the operation mode to the normal mode, and when the user designates heavy paper or rough paper, the controller may set the operation mode to the low speed mode. The input device 510 may be configured to acquire an instruction regarding image formation including a designation of an operation mode together with image data, from a computer connected to the image forming apparatus 9 directly or via a network. In this case, the controller 500 controls the operation of the image forming apparatus 9 in the operation mode designated in the instruction input from the computer. When no instruction explicitly designating a specific operation mode is input from the input device 510, the controller 500 controls the operation of the image forming apparatus 9 in the normal mode as a default operation mode.

Relationship Between Rotation Speed of Polygon Mirror and Resolution

In a case where the process speed of the low speed mode is reduced to a times ($\alpha$<1) that of the normal mode, there are two methods to achieve the same resolution in image formation in the low speed mode as that of the normal mode.

The first method is to use all the reflection surfaces 405a of the polygon mirror 405 in the low speed mode as in the normal mode, and to reduce the rotation speed of the polygon mirror 405 to a times that of the normal mode. In this case, the time required for a surface of the photosensitive member 4 to advance by 1 dot in the low speed mode equals to the time for the polygon mirror 405 to rotate 90° similarly to the normal mode. Therefore, reducing the rotation speed of the polygon mirror 405 allows for image formation in the low speed mode with the same resolution as that of the normal mode.

The second method is to use each alternate reflection surface 405a of the polygon mirror 405 in the low speed mode in exposing the photosensitive member 4, while rotating the polygon mirror 405 at a speed $2\alpha$ times that of the normal mode. In this case, since each alternate reflection surface 405a of the polygon mirror 405 is used, the time required for a surface of the photosensitive member 4 to advance by 1 dot equals to the time for the polygon mirror 405 to rotate 180°. Therefore, increasing the rotation speed of the polygon mirror 405 allows for image formation in the low speed mode with the same resolution as that of the normal mode. This means that, when $\alpha$>0.5, the rotation speed of the polygon mirror 405 will be faster in the low speed mode than in the normal mode.

Relationship Between Rotation Speed of Polygon Mirror and Laser Power

When the laser power at the light source 401 is constant, changing the rotation speed of the polygon mirror 405 changes the amount of light per 1 dot on the surface of the photosensitive member 4. If the rotation speed of the polygon mirror 405 is $\beta$ times that of the normal mode, the amount of light per 1 dot on the surface of the photosensitive member 4 will be $1/\beta$ times that of the normal mode. Namely, when the laser power is constant, reducing the rotation speed of the polygon mirror 405 ($\beta$<1) increases the amount of light per 1 dot on the surface of the photosensitive member 4. Increasing the rotation speed of the polygon mirror 405 ($\beta$>1) reduces the amount of light per 1 dot on the surface of the photosensitive member 4.

The change in the amount of light per 1 dot on the surface of the photosensitive member 4 affects the density of an image formed on a recording material. Therefore, in order to avoid changes in density of images formed in the normal mode and in the low speed mode, it is necessary to keep the amount of light per 1 dot on the surface of the photosensitive member 4 constant both in the normal mode and the low speed mode.

If the rotation speed of the polygon mirror 405 in the low speed mode is $\beta$ times that of the normal mode, the amount of light per 1 dot on the surface of the photosensitive member 4 can be made the same as that of the normal mode by making the power of laser output from the light source 401 $\beta$ times that of the normal mode. Namely, when the rotation speed of the polygon mirror 405 is to be made faster than in the normal mode, the laser power is made higher than that of the normal mode. On the other hand, when the rotation speed of the polygon mirror 405 is to be made slower than in the normal mode, the laser power is made lower than that of the normal mode. This way, even when the rotation speed of the polygon mirror 405 is changed in the low speed mode from that of the normal mode, the density of formed images can be prevented from changing largely from that of the normal mode.

Limitation of Adjustable Range of Laser Power

However, an adjustable range of laser power is limited. The maximum laser power is determined by characteristics of laser devices, for example, so that there is an upper limit to the adjustable range of laser power based on the characteristics of laser devices. On the other hand, if the laser power is low, the BD sensor 409 cannot perform accurate detection. Therefore, to execute control correctly based on the detection results of the BD sensor 409, the laser power cannot be made lower than a lower limit detectable by the BD sensor 409.

For example, let us assume that the upper limit of the adjustable range of laser power is $\gamma$ times ($\gamma$>1) the laser power of the normal mode, and the lower limit is $\delta$ times ($\delta$<1) the laser power of the normal mode. If, in the low speed mode, the polygon mirror 405 is to be rotated at a speed $\beta$ times ($\beta$>1) that of the normal mode, the laser power cannot be intensified to $\beta$ times that of the normal mode if $\beta$>$\gamma$. The amount of light on the photosensitive member 4 will therefore be insufficient compared to that of the normal mode, resulting in a reduced density of images formed in the low speed mode. On the other hand, if, in the low speed mode, the polygon mirror 405 is to be rotated at a speed $\beta$ times ($\beta$<1) that of the normal mode, the laser power cannot be attenuated to $\beta$ times that of the normal mode if $\beta$<$\delta$. The amount of light on the photosensitive member 4 will therefore be excessive compared to that of the normal mode, resulting in an increased density of images formed in the low speed mode.

Provided that the process speed of the low speed mode is $\alpha$ times ($\alpha$<1) that of the normal mode, the polygon mirror 405 could be controlled differently in the low speed mode in accordance with the value of a, to avoid large laser power adjustments. For example, when $\alpha$ is a value close to 1 (e.g., 0.75<$\alpha$<1), all of the reflection surfaces 405a of the polygon mirror 405 are used, while the rotation speed of the polygon mirror 405 is reduced to a times that of the normal mode, and the laser power is reduced to a times that of the normal mode. This suppresses an increase in image density. On the other hand, when a is a value far from 1 (e.g., 0.5<$\alpha$<0.75), each alternate one of the reflection surfaces 405a of the polygon mirror 405 is used, while increasing the rotation speed of the polygon mirror 405 to $2\alpha$ times that of the normal mode. The laser power is increased to 2α times that of the normal mode. This suppresses a reduction in image density. Smaller laser power adjustments help reduce design restrictions such as the sensitivity of the BD sensor 409, output characteristics of the laser device, and sensitivity of the photosensitive member 4, and therefore are preferable.

Developing Unit

Figure 3:
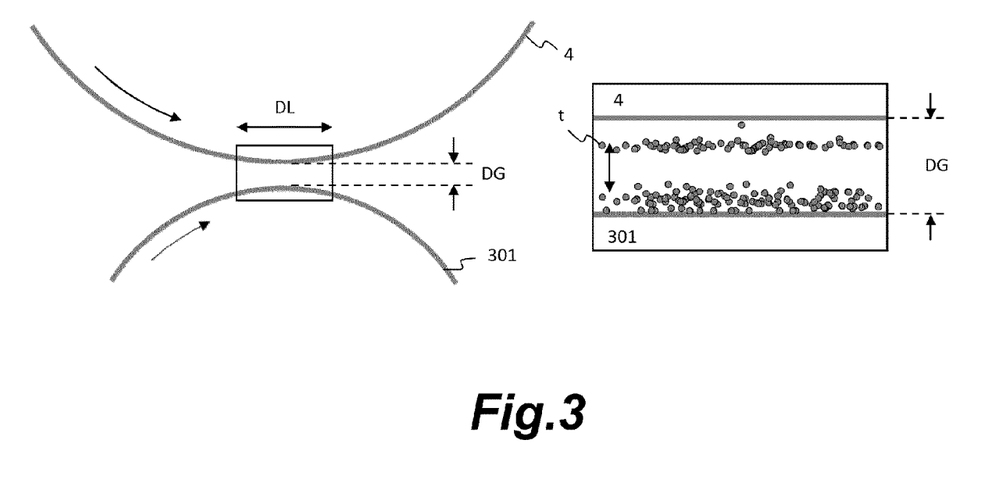
FIG. 3 is a conceptual diagram of a developing unit according to the embodiment.

FIG. 3 illustrates a conceptual diagram of the developing unit 3. The developing unit 3 is a developing unit that forms a toner image on the photosensitive member 4 by causing toner to adhere to the latent image formed on the photosensitive member 4. The developing unit 3 develops the latent image on the photosensitive member 4 into a toner image by a single-component magnetic jumping development method. The developing unit 3 includes a developing sleeve 301 serving as a rotatable toner carrying member positioned opposite the photosensitive member 4. A metal blade restricts magnetic toner as the developing sleeve 301 rotates so that the developing sleeve 301 is coated with the magnetic toner. A magnet inside the developing sleeve 301 maintains the magnetic toner on the developing sleeve 301. In this embodiment, magnetic toner having an average particle size of 8 μm was used.

The developing sleeve 301 and the photosensitive member 4 rotate at speeds with a predetermined ratio. This speed ratio is defined by gear ratios of gear trains for rotating the photosensitive member 4 and developing sleeve 301, and therefore constant irrespective of the rotation speed of the photosensitive member 4. In this embodiment, the developing sleeve 301 rotates at a speed that is 110% of the rotation speed of the photosensitive member 4.

A development gap DG of 350 μm is provided between the surface of the photosensitive member 4 and the developing sleeve 301. A developing bias, which is a square wave AC bias (frequency: 3000 Hz, Vpp: 1.7 kV) superposed on a DC bias, is applied to the developing sleeve 301. The toner on the developing sleeve 301 flies toward the surface of the photosensitive member 4 in a cloud-like form and develops a toner image corresponding to the latent image on the surface of the photosensitive member 4. The developing potential, represented as the mean value of the period of one cycle of the AC bias, is −300 V in this embodiment. The contrast between the potential of portions of the surface of the photosensitive member 4 exposed by the laser beam 208 and the developing potential is 200 V. Accordingly, an exposed portion of the photosensitive member 4 has a potential of −100 V.

Relationship Between Rotation Speed of Photosensitive Member and Development Properties In FIG. 3, DL denotes a region where an electric field created by the developing bias causes the toner to fly. In this region DL, the toner on the developing sleeve 301 travels back and forth between the photosensitive member 4 and the developing sleeve 301 by the force of the electric field formed by the developing bias. Since the size of the region DL does not change irrespective of the rotation speed of the photosensitive member 4 (transport speed of the recording material), when the rotation speed of the photosensitive member 4 is fast, the toner flies back and forth fewer times, and when the rotation speed of the photosensitive member 4 is slow, the toner flies back and forth more times. In this embodiment, the region DL is about 2 to 3 mm.

Figure 4:
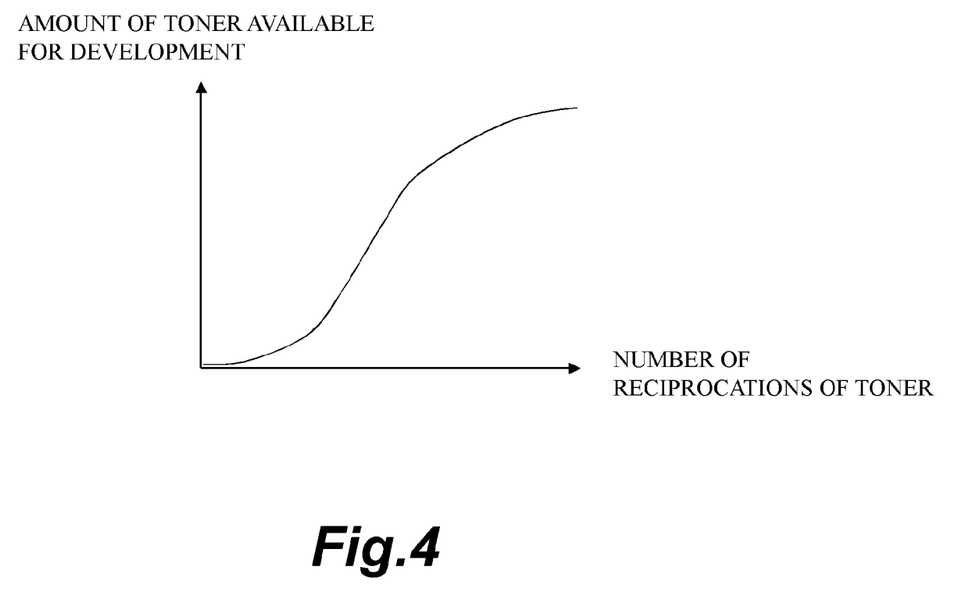
FIG. 4 is a graph showing the relationship between the number of reciprocations of toner in a development gap and the amount of toner available for development.

FIG. 4 shows the relationship between the number of reciprocations of toner (horizontal axis) in the region DL where toner can fly, and the amount of toner (vertical axis) that has flown over the development gap DG and is available for development. Toner flying across the development gap DG back and forth between the photosensitive member 4 and the developing sleeve 301 collides the toner adhered on the developing sleeve 301 by a magnetic or electrostatic force and knocks it out into the development gap DG to generate new flying toner. Therefore, the more there is toner traveling back and forth across the development gap DG, the more there is toner that flies over the development gap DG and becomes available for development. The same electrostatic latent image on the surface of the photosensitive member 4 forms a denser image when there is more toner available for development. Changes in density of formed images caused by changes in the amount of toner available for development are salient particularly in halftone, small dots, thin lines, and outline characters.

Figure 5:
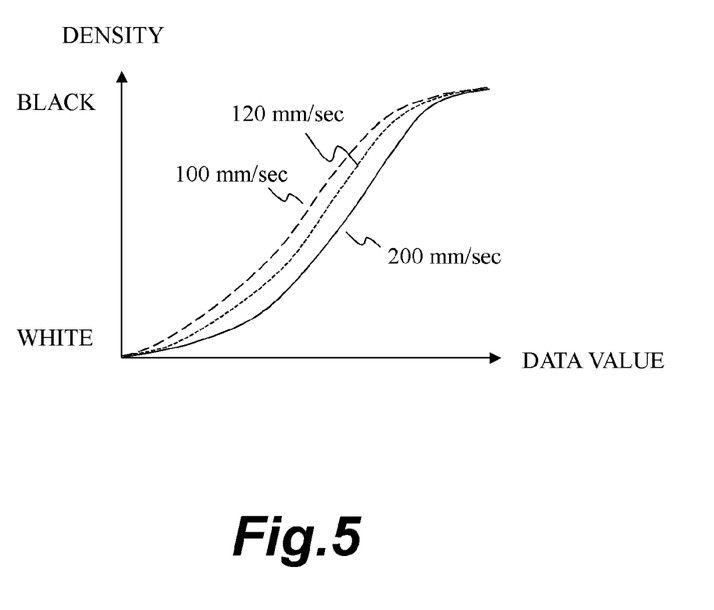
FIG. 5 is a graph showing the relationship between the process speed and the image density in the embodiment.

FIG. 5 shows the relationship between the rotation speed of the photosensitive member 4 and the halftone density. The horizontal axis represents data values of a halftone image, and the vertical axis represents the actual density of the halftone formed on a recording material. FIG. 5 shows the respective relationships between the halftone image data values and the density when the rotation speed of the photosensitive member 4 is 200 mm/sec, 120 mm/sec, and 100 mm/sec. The graphs show that the density of the image formed on the recording material is increased when the rotation speed of the photosensitive member 4 is reduced, even though the image data values are the same.

Fixing Unit

Figure 6:
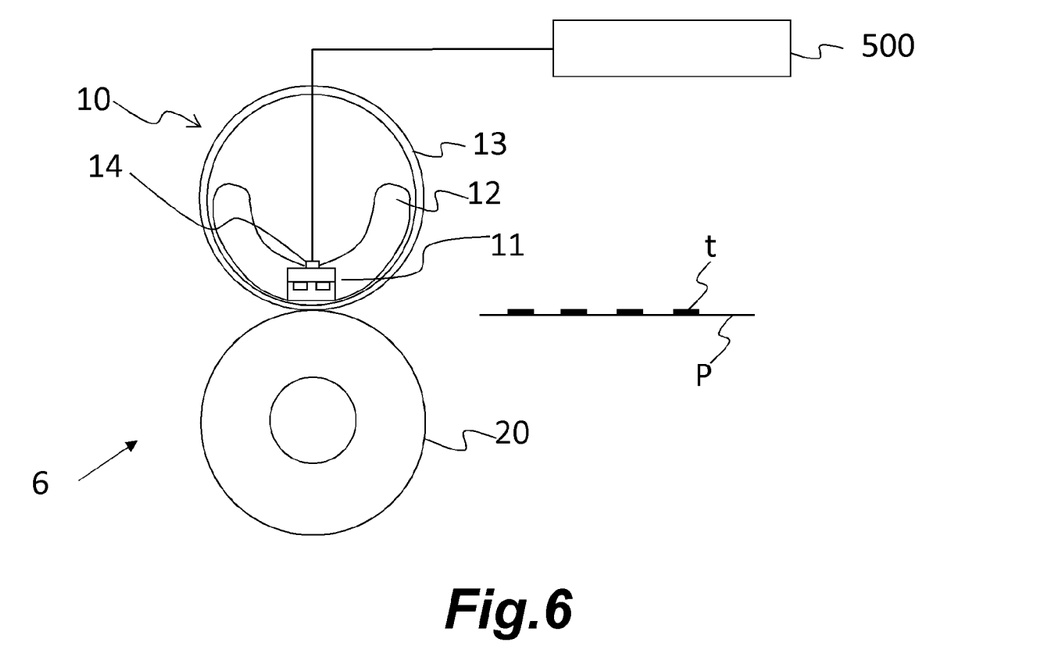
FIG. 6 is a conceptual diagram of a fixing unit according to the embodiment.

Next, the fixing unit 6 will be described with reference to FIG. 6. The fixing unit 6 of this embodiment is configured as a film heating-type fixing apparatus. The fixing unit 6 includes a film unit 10 configured as a heating apparatus and a pressure roller 20. The film unit 10 includes a heat resistant fixing film 13 that is a rotating body for heat application or a heat conduction member, a heater 11 that is a heating member, and a holder 12 that is a heater holding member. The heater 11 is provided inside the fixing film 13. The pressure roller 20 that is a rotating body for pressure application is provided opposite the film unit 10. A recording material P on which a toner image t is formed is pinched at a fixing nip section between the fixing film 13 and the pressure roller 20 and transported. The toner image t is fixed on the recording material P as it moves with the fixing film 13.

A thermistor 14 or a temperature detection member is provided to the heater 11, disposed on an opposite side from the sliding surface between the heater and the fixing film 13, in contact with the fixing film. The controller 500 controls electric current applied to the heater 11 to keep the temperature of the heater 11 at a predetermined level based on the temperature detected by the thermistor 14. In this embodiment, in the normal mode, the heater is controlled so that the detection temperature of the thermistor 14 when a recording material passes through the fixing nip section is 180° C.

Settings in Low Speed Mode

Heavy paper or rough paper conducts less heat from the heater 11 to toner for melting the toner when the paper passes through the fixing nip section so that toner does not fix well. When forming images on such a recording material, fixability can be secured by performing image formation in a low speed mode. This is because the process speed is slower in the low speed mode, which prolongs the time for the recording material to pass through the fixing nip section and enables sufficient heat to be conducted from the heater 11 to the toner.

On the other hand, as mentioned above, a reduced process speed increases the number of back and forth movements of the toner in the toner flying region DL and increases the density of formed images. Therefore, it is not preferable to largely reduce the process speed in order to secure fixability. To achieve the same resolution both in the low speed mode and the normal mode, slowing down the rotation speed of the polygon mirror 405 while using all of the reflection surfaces 405a, or increasing the rotation speed of the polygon mirror 405 while using each alternate reflection surface 405a, are both possible. Slowing down the rotation speed of the polygon mirror 405 increases the density of formed images, while increasing the rotation speed of the polygon mirror 405 lowers the density of formed images.

In consideration of a balance between these image qualities and fixability, in this embodiment, the controller 500 controls the process speed in the low speed mode faster than 0.5 times that of the normal mode and slower than 0.75 times that of the normal mode. In the low speed mode, the controller 500 controls the polygon mirror 405 to use each alternate reflection surface 405a to reflect the laser beam, and to rotate faster than in the normal mode. Provided that the process speed of the low speed mode is α times (0.5<α<0.75) that of the normal mode, the controller 500 controls the polygon mirror 405 to rotate at a speed that is 2α times (1<2α<1.5) that of the normal mode in the low speed mode. This way, images are formed in the low speed mode with the same resolution as that of the normal mode. In the normal mode, the controller 500 controls the polygon mirror 405 to use all the reflection surfaces 405a to reflect the laser beam. The number of reflection surfaces 405a of the polygon mirror 405 is not limited to four. In the low speed mode, the controller 500 may control the polygon mirror 405 to use only some of the plurality of reflection surfaces 405a to reflect the laser beam 208. In this case, the rotation speed of the polygon mirror 405 in the low speed mode may be set suitably based on a ratio between a total number of the reflection surfaces 405a and the number of surfaces that are used.

Since the process speed of the low speed mode is faster than 0.5 times that of the normal mode, it is prevented that the density of formed images is too high because of the process speed being too slow. Therefore, when an image to be formed includes features whose image qualities are susceptible to density changes such as halftone density, appearance of outline characters, small dot size, and so on, the image can be formed favorably even in the low speed mode. Since a sufficient time for heating is secured at the fixing nip for the toner to melt in the low speed mode, favorable image formation is made possible on a recording material with poor toner fixability such as rough paper. In the low speed mode, the effect of increasing the image density by a lowered process speed and the effect of reducing the image density by an increased rotation speed of the polygon mirror 405 appear at the same time, so that fluctuations in image density can be minimized. Laser power may be increased as required to mitigate the influence of reduced density caused by an increased rotation speed of the polygon mirror 405.

Evaluation of Changes in Image Qualities in Normal Mode and Low Speed Mode

An image was formed each in the normal mode and the low speed mode with varying low speed mode conditions in some Examples of the image forming apparatus according to the embodiment, and changes in image qualities were evaluated. An image of eleven halftones from solid white (density 0%) to solid black (density 100%) with an increment of 10% was used as an image for evaluation. This image was formed each in the normal mode and the low speed mode and the image densities were compared. Lightness L* of each of the eleven halftones in the formed image was determined, and the maximum value of difference in lightness between the normal mode and the low speed mode was selected as representative value ΔL*. Values of ΔL* are based on the following subjective impressions, 5 being the allowable limit.

ΔL*<3 Difference barely visible between two images when compared side by side.

3<ΔL*<5 Difference slightly visible between two images when compared side by side but tolerable.

5<ΔL* Difference clearly visible between two images when compared side by side.

Difference in image density between the normal mode and the low speed mode can occur in outline characters and small dots similarly to halftone images. These images also showed a tendency similar to the subjective evaluation results of density difference observed in halftone images.

Fixability on rough paper in the low speed mode was also evaluated. For the rough paper, Neenah bond classic laid text paper was used. An image of a text in 12 pt was used as an image for evaluation. Images formed on the rough paper were visually inspected to check if there were hollow character defects due to insufficient melting of toner. In the following evaluation results, circles indicate that there were no hollow character defects, and crosses indicate that there were hollow character defects. Table 1 shows conditions and evaluation results of changes in image qualities between the normal mode and the low speed mode of Examples according to the invention and Comparative Examples.

TABLE 1

| | Speed in Low Speed Mode (Ratio to Normal Mode Speed) | Surface Alternation | Rotation Speed of Polygon Mirror (Ratio to Normal Mode Speed) | Halftone Density Difference ΔL* | Fixability on Rough Paper |
|---|---|---|---|---|---|
| Example 1 | 0.57 | ○ | 1.14 | 3.5 | ○ |
| Example 2 | 0.67 | ○ | 1.33 | 2.8 | ○ |
| Example 3 | 0.55 | ○ | 1.11 | 4.1 | ○ |
| Comparative Example 1 | 0.5 | ○ | 1 | 5.2 | ○ |
| Comparative Example 2 | 0.86 | X | 0.86 | 2.3 | X |
| Comparative Example 3 | 0.57 | X | 0.57 | 7 | ○ |

Example 1

The process speed of the low speed mode was 0.57 (4/7) times that of the normal mode. Using each alternate reflection surface 405a of the polygon mirror 405, the polygon mirror 405 was rotated at a speed that was 1.14 (8/7) times that of the normal mode. The resolution in the processing direction of the latent image formed on the surface of the photosensitive member 4 was 600 dpi both in the normal mode and the low speed mode. The control target value for the detection temperature of the thermistor 14 when a recording material passes through the nip section of the fixing unit 6 was 180° C. both in the normal mode and the low speed mode. The maximum value ΔL* of the difference in lightness of eleven halftones between the normal mode and the low speed mode was 3.5, i.e., the difference in density of halftones between the normal mode and the low speed mode was within the tolerable limit. This is assumed to be because of the difference in process speed between the low speed mode and the normal mode not being large. No hollow character defects were observed in fixation results on rough paper in the low speed mode. It is assumed that a sufficient time was secured for the heating at the fixing nip section.

Example 2

The process speed of the low speed mode was 0.67 (2/3) times that of the normal mode. Using each alternate reflection surface 405a of the polygon mirror 405, the polygon mirror 405 was rotated at a speed that was 1.33 (4/3) times that of the normal mode. Other conditions are the same as those of Example 1. The maximum value ΔL* of the difference in lightness between the normal mode and the low speed mode was 2.8, i.e., there was hardly any difference in density of halftones between the normal mode and the low speed mode. This is assumed to be because of the small difference in process speed between the low speed mode and the normal mode. No hollow character defects were observed in fixation results on rough paper in the low speed mode. It is assumed that a sufficient time was secured for the heating at the fixing nip section.

Example 3

The process speed of the low speed mode was 0.55 (5/9) times that of the normal mode. Using each alternate reflection surface 405a of the polygon mirror 405, the polygon mirror 405 was rotated at a speed that was 1.11 (10/9) times that of the normal mode. Other conditions are the same as those of Example 1. The maximum value ΔL* of the difference in lightness between the normal mode and the low speed mode was 4.1, i.e., the difference in density of halftones between the normal mode and the low speed mode was within the tolerable limit. This is assumed to be because of the difference in process speed between the low speed mode and the normal mode not being large. No hollow character defects were observed in fixation results on rough paper in the low speed mode. It is assumed that a sufficient time was secured for the heating at the fixing nip section.

Comparative Example 1

The process speed of the low speed mode was 0.5 (1/2) times that of the normal mode. Using each alternate reflection surface 405a of the polygon mirror 405, the polygon mirror 405 was rotated at the same speed as that of the normal mode. Other conditions are the same as those of Example 1. The maximum value ΔL* of the difference in lightness between the normal mode and the low speed mode was 5.2, i.e., the difference in density was clearly observed. This is assumed to be because of the large difference in process speed between the low speed mode and the normal mode. No hollow character defects were observed in fixation results on rough paper in the low speed mode.

Comparative Example 2

The process speed of the low speed mode was 0.86 (6/7) times that of the normal mode. Using all the reflection surfaces 405a of the polygon mirror 405, the polygon mirror 405 was rotated at a speed that was 0.86 (6/7) times that of the normal mode. Other conditions are the same as those of Example 1. The maximum value ΔL* of the difference in lightness between the normal mode and the low speed mode was 2.3, i.e., there was hardly any difference in density of halftones between the normal mode and the low speed mode. This is assumed to be because of the small difference in process speed between the low speed mode and the normal mode. Some hollow character defects were observed in fixation results on rough paper in the low speed mode. This is assumed to be due to the process speed being too fast in the low speed mode for the toner to be sufficiently heated and melted.

Comparative Example 3

The process speed of the low speed mode was 0.57 (4/7) times that of the normal mode. Using all the reflection surfaces 405a of the polygon mirror 405, the polygon mirror 405 was rotated at a speed that was 0.57 (4/7) times that of the normal mode. Other conditions are the same as those of Example 1. The maximum value ΔL* of the difference in lightness between the normal mode and the low speed mode was 7.0, i.e., the difference in density was clearly observed. The lower limit of laser power detectable by the BD sensor 409 used in Comparative Example 3 was 0.7 times the laser power during the normal mode. Accordingly, the amount of light per 1 dot on the surface of the photosensitive member 4 in the low speed mode was $0.7 \times (1/0.57) = 1.23$ times that of the normal mode, i.e., the laser power was not maintained at the same level as that of the normal mode. As a result, the image formed in the low speed mode had a density that was 10% or more higher than that of the normal mode. This apparently led to the clearly observable difference in density. No hollow character defects were observed in fixation results on rough paper in the low speed mode.

As demonstrated above with Examples 1 to 3, the image forming apparatus to which the present invention was applied was able to suppress changes in image qualities between the normal mode and the low speed mode, and to form images with consistent image qualities irrespective of the process speed. When forming images on a recording material with poor toner fixability, application of the low speed mode successfully made toner fix sufficiently on the recording material, and the image was formed with image qualities comparable to those of the normal mode.

While one embodiment has been described in which the present invention is applied to an image forming apparatus that employs a single-component magnetic jumping development method, the development method is not limited to this example. For example, application of the present invention can provide the effect of minimizing a change in image quality in a low speed mode in other development systems such as contact development using a single-component non-magnetic toner or development systems that use a dual component toner, because, although not as distinctly as in image formation by a jumping development method, a change in process speed similarly causes a change in image density in these development systems. While one embodiment has been described in which the image forming apparatus uses a film heating system as the fixing apparatus, the fixing apparatus is not limited to this type. For example, application of the present invention can provide the effect of improving toner fixability in a low speed mode in other fixing systems because fixability tends to improve by reducing the process speed in fixing systems such as a roller heating system and flash fixing system similarly to the film heating system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110327, filed on Jul. 1, 2021, which is hereby incorporated by reference herein in its entirety.

What is claimed is:

1. An image forming apparatus comprising:
a photosensitive member;
a polygon mirror rotated by a drive unit and having a plurality of reflection surfaces;
an exposure unit configured to form a latent image on the photosensitive member by reflecting a laser beam emitted from a light source with the polygon mirror and by scanning the photosensitive member;
a developing unit configured to form a toner image on the photosensitive member by causing toner to adhere to the latent image formed on the photosensitive member;
a transfer unit configured to transfer the toner image formed on the photosensitive member onto a recording material directly or via an intermediate transfer member;
a fixing unit configured to fix the toner image by heating the recording material onto which the toner image has been transferred; and
a control unit configured to control operation of the image forming apparatus in a plurality of operation modes including a normal mode and a low speed mode having a slower process speed than the normal mode in accordance with an input instruction, the process speed defining a speed of the recording material passing through the fixing unit,
wherein the control unit controls the polygon mirror of the exposure unit to use all of the plurality of reflection surfaces to reflect the laser beam when an instruction designating the normal mode as the operation mode is input, or when no instruction designating a specific operation mode is input, and
the control unit controls making the process speed of the low speed mode faster than 0.5 times the process speed of the normal mode, rotating the polygon mirror faster than in the normal mode, and controlling the polygon mirror of the exposure unit to use only some of the plurality of reflection surfaces to reflect the laser beam, when an instruction designating the low speed mode as the operation mode is input.

2. The image forming apparatus according to claim 1, wherein the control unit controls the process speed in the low speed mode to be faster than 0.5 times the process speed of the normal mode and slower than 0.75 times the process speed of the normal mode.

3. The image forming apparatus according to claim 1, wherein the control unit controls to increase a power level of light emitted from the light source of the exposure unit in the low speed mode to a power level higher than a power level of the light emitted from the light source in the normal mode.

4. The image forming apparatus according to claim 1, wherein the control unit controls the polygon mirror of the exposure unit to use each alternate one of the plurality of reflection surfaces to reflect the laser beam in the low speed mode.

5. The image forming apparatus according to claim 4, wherein, when the process speed in the low speed mode is $\alpha$ times the process speed in the normal mode, the control unit controls to rotate the polygon mirror in the low speed mode at a speed $2\alpha$ times a rotation speed of the polygon mirror in the normal mode.

6. The image forming apparatus according to claim 1, wherein the developing unit is configured to perform development by a single-component magnetic jumping development method.

7. The image forming apparatus according to claim 1, wherein the control unit controls the operation of the image forming apparatus in the normal mode as a default operation mode.

8. The image forming apparatus according to claim 1, further comprising an input unit configured to receive an input of an instruction designating a type of the recording material from a user,
the control unit controls the operation of the image forming apparatus in an operation mode in accordance with the type of the recording material designated in the instruction input from the input unit.

9. The image forming apparatus according to claim 8, wherein the control unit controls the operation of the image forming apparatus in the normal mode when no instruction is input from the input unit.

10. The image forming apparatus according to claim 1, further comprising an input unit receiving an input of an instruction designating an operation mode from a user,
the control unit controls the operation of the image forming apparatus in the operation mode designated in the instruction input from the input unit.

* * * * *